United States Patent Office 3,365,762
Patented Jan. 30, 1968

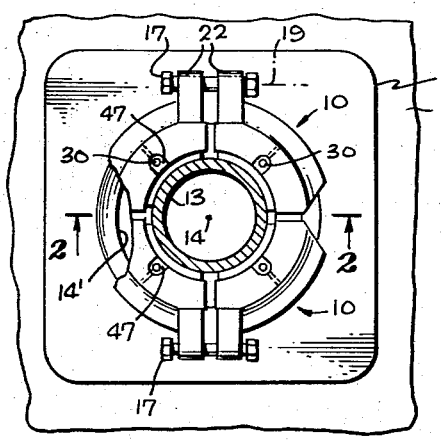
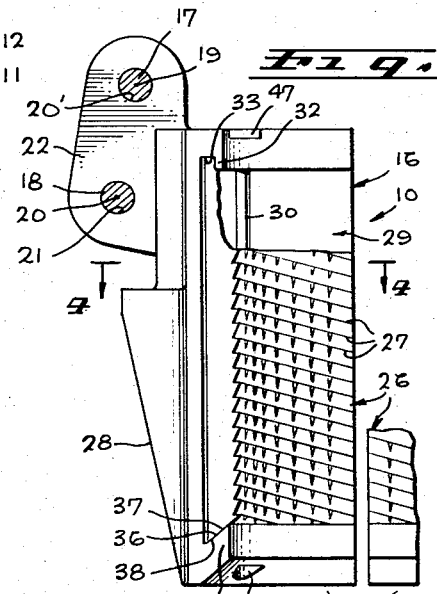
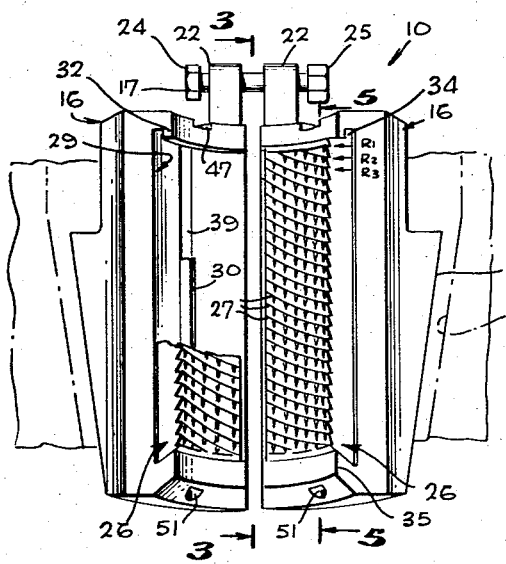
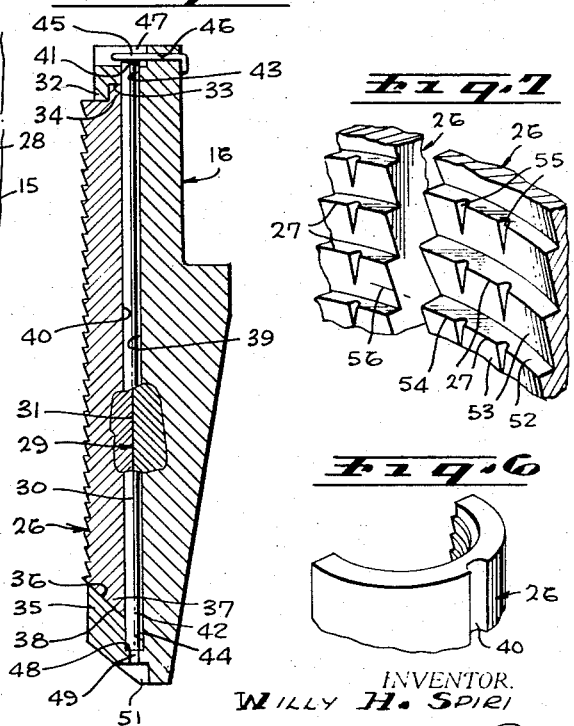
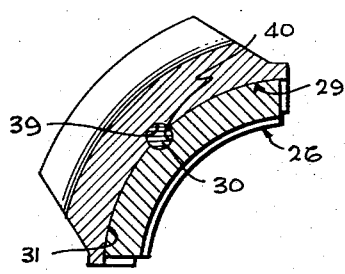

3,365,762
WELL PIPE GRIPPING STRUCTURE
Willy H. Spiri, Whittier, Calif., assignor to The Cavins Co., Long Beach, Calif., a corporation of California
Filed Aug. 2, 1965, Ser. No. 476,307
8 Claims. (Cl. 24—263)

ABSTRACT OF THE DISCLOSURE

A well slip including a slip body having a pipe gripping insert which is slidably movable horizontally into an arcuate guideway in the slip body, and is retained within the guideway by upper and lower lips on the body, which lips have unsymmetrical retaining surfaces designed to prevent reception of the insert in the guideway in inverted position. The insert is retained against removal by a pin which extends vertically within opposed grooves in the body and insert, and which is preferably completely surrounded by the material of the body at the upper and lower ends of the pin. In an assembly including two of the gripping inserts, the two inserts are both provided with teeth which advance vertically as they advance circularly, and with the teeth of one insert positioned out of alignment with the teeth of the other insert to increase the resistance to rotation of the pipe within the slip structure.

This invention relates to an improved slip arrangement for gripping and supporting a well pipe.

A major object of the invention is to provide a slip assembly which has a gripping element designed to be very easily removed from and reattached to a slip body by which it is carried. Especially contemplated is a device of this character in which the gripping element, though removable at will, is so related to the body of the slip that, in use, both vertical and rotary load forces are transmitted from the gripping element to the slip body in a very direct and positive manner. As will appear, the detachable mounting arrangement for the gripping element so connects the gripping element to the slip body as to virtually preclude unwanted looseness of the gripping element, and thereby prevent such wear on and damage to both the gripping element and slip body as might result from relative motion of the parts. Additionally, the mounting arrangement for the gripping element or elements is designed to enable the use of a gripping element of very substantial width circularly about the axis of the gripped pipe, the element desirably being of a width to extend through about 90 circular degrees, so that four such gripping elements may contact and grip the pipe about substantially its entire periphery.

Structurally, a gripping element embodying the invention is preferably arcuate in shape, and detachably mounted to the slip body by sliding reception within an arcuate guideway or guideways carried by or formed in the slip body. The gripping element may be retained against detachment from the slip body by a pin which extends vertically and is insertable vertically into a position of holding engagement with the two interconnected parts. This blocking pin is desirably received partially within a vertical groove formed in a rear surface of the gripping element, and partially within an opposed vertical groove formed in the slip body, to thereby interlock the two parts against separation, and transmit rotary forces or torque from the gripping element to the slip body, and vice versa.

A particular feature of the invention resides in the manner in which the discussed locking pin is very positively located in fixed position relative to the slip body. For this purpose, the pin in its active locking position has upper and lower end portions which project upwardly and downwardly beyond the gripping element, and are both received within passages in the upper and lower portions of the slip body. At the locations of each of these passages, the material of the slip body extends entirely about and thus accurately locates the corresponding end of the locking pin, so that this pin is effectively located at both its upper and lower ends, to thereby prevent unwanted wearing motion of the pin relative to the slip body.

A further object of the invention is to provide an improved type of gripping face for a slip element, which face has irregularities so shaped as to effectively transmit both rotary and vertical forces to a contacted pipe. To attain this result, I utilize teeth on the gripping element which have elongated gripping edges disposed at an inclination to advance progressively vertically as they advance circularly about the axis of the gripped pipe. These inclined teeth may be arranged in a series of vertically spaced groups of such teeth, with the teeth in each individual group having their mentioned gripping edges aligned longitudinally with one another, so that the overall appearance of the series of groups of teeth is similar to the appearance of a series of helically advancing screw threads. In order to maximize the torque transmission capacity of the gripping faces, I find it desirable to utilize two or more of the gripping elements having the discussed inclined teeth, with the gripping edges of the teeth of one element being offset vertically with respect to the edges of the other element, so that the teeth on the two or more different gripping elements are not aligned in a manner allowing the gripping elements to merely screw helically along the gripped pipe.

Another feature of the invention resides in the formation of the gripping elements and their guideways in the slip bodies to enable insertion of the slip elements in only one orientation relative to the slip bodies, so that the gripping elements can not be installed in inverted positions, in which the gripping teeth would be improperly oriented.

The above and other features and objects of the invention will be better understood from the following detailed description of the typical embodiment illustrated in the accompanying drawing, in which:

FIG. 1 is a plan view showing two complementary slip assemblies constructed in accordance with the invention and shown positioned within a well drilling rotary table;

FIG. 2 is an enlarged perspective view of one of the pairs of the slips shown in FIG. 1;

FIG. 3 is a further enlarged vertical section taken on line 3—3 of FIG. 2;

FIG. 4 is a horizontal section taken on line 4—4 of FIG. 3;

FIG. 5 is a vertical section taken on line 5—5 of FIG. 2;

FIG. 6 is a fragmentary perspective view showing the rear side of one of the gripping elements; and FIG. 7 is a greatly enlarged fragmentary representation of a few of the teeth of two adjacent gripping elements.

Referring first to FIG. 1, I have shown in plan view in that figure two slip assemblies 10 as they appear when mounted within a well drilling rotary table 11 containing a master bushing structure somewhat diagrammatically represented at 12. A well pipe 13 extends vertically through the rotary table and through the central opening 14' of the master bushing, with one pipe and the rest of the apparatus all centered about the vertical axis 14 of the table. Internally, master bushing 12 contains or forms the usual downwardly tapering annular slip bowl surface 15 (FIG. 2), which acts to cam the slip assemblies 10 radially inwardly against pipe 13, in gripping contact therewith.

One of the two slip assemblies 10 is illustrated in greater detail in FIG. 2, from which it will be apparent that each of these assemblies consists of two similar slip bodies 16 movably interconnected by a pair of parallel horizontal guide pins or bolts 17 and 18 which allow relative shifting movement of the two bodies 16 toward and away from one another (that is, in the direction of axes 19 and 20 of the bolts). These bolts 17 and 18 are slidably received within corresponding aligned apertures 20' and 21 formed in two parallel spaced ears or plugs 22 which are integral with and project radially outwardly from the two slip bodies 16. As will be apparent from FIGS. 1 and 2, each of the bolts may have enlargements at both of its ends, to prevent complete separation of the slip bodies 16, with these enlargements typically being formed as a head 24 at one end of the bolt and a nut 25 threadedly connected to its opposite end.

Each of the slip bodies 16 removably carries a well pipe gripping element or die 26, having gripping teeth 27 formed on its radially inner surface. These gripping elements 26 and the slip bodies 16 are both of essentially arcuate configuration, about main axis 14 of the slip structure and well, with each slip body and the associated gripping element desirably extending through approximately 90 circular degrees about the axis 14, as previously mentioned.

At is radially outer side, each slip body 16 has a downwardly tapering external frusto-conical surface 28, tapering in correspondence with internal slip bowl surface 15 which is formed in or carried by the master bushing. Internally, each slip body 16 forms an arcuate guideway 29 for slidably receiving the associated gripping element 26. This guideway may be of essentially uniform vertical section along its entire 90 degree extent about axis 14, except at the location of a locking pin 30 by which gripping element 26 is held in position. This primary cross section of the guideway 29 is defined by a vertical cylindrical surface 31, centered about axis 14, and forming the radially outer side of the guideway. At the upper end of surface 31, the slip body 16 has an overhanging downwardly projecting arcuate lip 32, defining an arcuate dovetail groove 33 centered about axis 14 for slidably receiving and retaining an arcuate upwardly projecting edge portion 34 of gripping element 26. Similarly, the lower portion of body 16 forms an arcuate upwardly extending lip 35 which defines a second arcuate dovetail groove 36 for slidably receiving and confining the lower arcuate edge portion 37 of element 26. As will be apparent from FIGS. 2 and 3, the upper dovetail groove 33 and the correspondingly shaped upper edge 34 of the gripping element have a cross section which is different than that of the lower groove 36 and its received portion 37 of the gripping element, with these grooves and edges being so related that element 26 can not be inverted, that is, portion 37 will not slide into groove 36. More particularly, it is preferred that upper lip 32 and groove 33, and the received projection 34, be of the rectangular cross section illustrated in FIG. 3, while the engaging support surfaces 38 at the lower end of gripping element 26 are desirably inclined upwardly and inwardly, and of frusto-conical configuration, to assure effective support of gripping element 26 at its lower end along the entire radial extent of surfaces 38. This formation of the guideway and element 26 in a manner preventing insertion of the latter in an inverted condition prevents gripping teeth 27 from being improperly oriented with respect to the pipe 13.

Locking pin 30 may be externally cylindrical, as brought out clearly in FIG. 4, and in its locking condition is received partially within a semi-cylindrical vertical groove 39 formed at the center of surface 31, and also partially within an opposed vertical semi-cylindrical groove 40 formed in the radially outer surface of element 26. Pin 30 is a close fit within these grooves, to effectively lock gripping element 26 against any motion relative to body 16, and extends vertically along the entire height of the engaged element 26. Also, as seen in FIG. 5, pin 30 has an upper portion 41 which projects upwardly beyond the upper edge of gripping element 26, and a lower portion 42 which projects downwardly beneath the bottom of the gripping element. Portion 30 is received within a vertical cylindrical passage 43 formed in the upper portion of body 16, the wall of which passage completely encircles portion 41 of the pin, and is of a diameter corresponding to pin 41, and is engageable with the outer surface of the pin about its entire 360 degree circular extent. Similarly, the lower end 42 of pin 30 is received within a vertical cylindrical passage 44 in the body, which passage is of a diameter corresponding to that of the pin, so the wall of this passage engages the pin about its entire 360 degree periphery. In this way, the upper and lower ends of pin 30 are completely encircled and very positively confined by the slip body 16, to prevent slight shifting movement of the pin within the body, and thereby prevent such wearing of the parts as might result from this shifting movement.

Pin 30 is assembled within the body in its locking position by inserting the pin downwardly through passage 43. The pin is then retained against unwanted upward removal from the body 16 by a cotter key 45, which is insertible rearwardly into and through a horizontal cotter key passage 46 in the body, to the FIG. 5 position in which the head of the cotter key is received directly above pin 30 in blocking relation thereto. As will be apparent from FIG. 5, the body 16 is recessed locally at 47, just sufficiently to allow for reception and insertion of the cotter key.

The lower end of the pin is supported on a transverse bottom shoulder 48, defining the lower end of passage 44. Extending downwardly from the center of this shoulder 48, body 16 contains a passage of reduced diameter 49, which opens downwardly at its lower end 50, so that a screw driver or other tool may be inserted upwardly through passage 49 to be driven upwardly against pin 30, for forcing that pin out of its locking position within the body. The body may be locally recessed or cut away at 51, to provide better access to passage 49 by a screw driver or other tool.

The individual teeth 27 of each gripping element 26 have the essentially ratchet shaped vertical cross section brought out in FIGS. 2, 3 and 5. More specifically, each of these teeth has an upper essentially horizontal but desirably slightly undercut face or surface 52, and an inclined more directly vertical opposite or lower face 53. These two faces 52 and 53 meet at a gripping edge 54, which may be relatively sharp, and which extends essentially horizontally and essentially arcuately about main axis 14 of the apparatus. The teeth are arranged in a series of vertically spaced rows R1, R2, R3, etc. of such teeth (FIG. 2), with the gripping edges 54 of all of the teeth in each of the individual rows being aligned longitudinally with one another. It is also noted, as best brought out in FIGS. 2 and 3, that the edges 54 are disposed at an inclination, to progressively advance upwardly as they advance circularly about axis 14, so that the various rows assume a helical configuration similar to that of a screw thread, with the threads being interrupted at the cut-away areas 55 between successive teeth at each level.

As brought out in FIG. 7, the two gripping elements 26 carried by the two slip bodies 16 of each assembly 10 in FIG. 2 are desirably so related to one another that the gripping edges 54 of one of the elements 26 are not in alignment longitudinally with the edges 54 of the other element 26. That is, if the helical line 56 representing the main locus of the gripping edges 54 of the right-hand gripping element 26 in FIG. 7 is continued to the left beyond that gripping element, it is not aligned helically, or longitudinally of the cutting edges, with the edges 54 of the second gripping element 26, but rather preferably is received mid-way between a pair of such vertically successive spaced gripping edges. This same non-aligned relation preferably exists at each of the four locations in FIG. 1 at which two of the gripping elements 26 are received adjacent one another.

In using the described slip apparatus, when it is desired to support pipe 13 within the rotary table by the two slip assemblies 11, these assemblies are merely inserted downwardly into the slip bowl recess 14', to be cammed radially inwardly by wall 15 of that recess against the pipe and in gripping and supporting relation with respect thereto. By virtue of the inclination of the tooth edges 54, these edges act both to support the weight of the pipe, and to effectively transmit torque to or take rotary load forces from the pipe (as a result of the vertical component of the inclined gripping edge 54). The non-aligned relationship between the teeth of adjacent gripping elements 26, as brought out by the discussion of the locus line 56 in FIG. 7, maximizes the effectiveness cf the locus line torque is transmitted to and from the pipe, since the non-aligned teeth of one element 26 can not be screwed or advanced circularly into the grooves formed by the teeth of the next successive gripping element. The mounting of the gripping elements in a manner such that they can not be inverted in their slip bodies 16 assures maintenance of this non-aligned relationship between the various teeth. The rotary load forces are transmitted between bodies 16 and gripping elements 26 by pins 30. When it becomes desirable to replace the gripping elements 26, or to substitute elements having a changed internal diameter, this may be done by merely removing the various cotter keys 45, driving pins 30 upwardly, sliding the gripping elements 26 arcuately out of their guideways 29, sliding the changed gripping elements back into those recesses, and reinserting the pins 30 and cotter keys 45.

I claim:

1. A well slip structure including two gripping elements having irregularized gripping faces for contacting and gripping a well pipe at circularly offset locations, each of said faces curving essentially in correspondence with said pipe, each face having a series of teeth forming elongated gripping edges, the individual edges terminating at two opposite ends of the edges and advancing circularly about the axis of said pipe in extending between said ends, said edges being inclined to advance vertically as they advance circularly about the axis of the pipe, the gripping edges of one of said elements being offset vertically with respect to the gripping edges of the other element to locations vertically between positions of true longitudinal alignment with individual gripping edges of said other element.

2. A well slip comprising a slip body having a radially outer cam surface shaped to engage a slip bowl structure and be cammed radially inwardly thereby, a gripping insert detachably carried by said body at the radially inner side thereof and constructed to engage and grip a well pipe in supporting relation, said gripping insert extending essentially arcuately about a generally vertical axis, means carried by said body defining an essentially arcuate retaining guideway into and out of which said arcuate insert is slidably movable essentially arcuately about said axis and shaped to retain said insert to the body, a locking pin extending essentially vertically and movable essentially vertically into and out of a locking position, said pin in said locking position extending vertically along the rear side of said insert and being partially received in each of two opposed grooves in said body and insert and having an upper portion projecting upwardly beyond the insert and a lower portion projecting downwardly below the insert, said body having an upper portion above said grooves which receives and completely encircles said upper portion of the pin, said body having a lower portion below said grooves which receives and completely encircles and locates said lower portion of the pin to coact with said upper portion of the body in positively retaining the pin in essentially fixed position in the body, said guideway including two arcuate retaining lips carried by said body at the upper and lower ends of said guideway and projecting downwardly and upwardly respectively to overhang and slidably receive and guide upper and lower edge portions of the insert, said two overhanging lips having surfaces which engage radially outwardly against upper and lower portions respectively of said insert in retaining relation and which are disposed at unsymmetrical angles with respect to one another so that the insert is prevented by the unsymmetrical relationship of said surfaces from sliding into said guideway in inverted condition.

3. A well slip as recited in claim 2, in which said pin is externally cylindrical, and said two grooves are each substantially semi-cylindrical to each receive essentially one half of the pin.

4. A well slip comprising a slip body having a radially outer cam surface shaped to engage a slip bowl structure and be cammed radially inwardly thereby, a gripping insert detachably carried by said body at the radially inner side thereof and constructed to engage and grip a well pipe in supporting relation, said gripping insert extending essentially arcuately about a generally vertical axis, means carried by said body defining an essentially arcuate retaining guideway into and out of which said arcuate insert is slidably movable essentially arcuately about said axis and shaped to retain said insert to the body, said guideway having a radially inwardly facing essentially vertical surface disposed arcuately about said axis and against which an arcuate outer surface of the insert is slidably engageable, said guideway including two arcuate retaining lips carried by said body at the upper and lower ends of said guideway and projecting downwardly and upwardly respectively to overhang and slidably receive and guide upper and lower edge portions of the insert, said two overhanging lips having surfaces which engage radially outwardly against upper and lower portions respectively of said insert in retaining relation and which are disposed at unsymmetrical angles with respect to one another so that the insert is prevented by the unsymmetrical relationship of said surfaces from sliding into said guideway in inverted condition, and a locking pin extending essentially vertically and movable essentially vertically into and out of a locking position, said pin in said locking position extending vertically along the rear side of said insert and through substantially the entire vertical extent of the insert and being partially received in each of two opposed grooves in said body and insert to retain the insert against arcuate removal from the body and to transmit torque about said axis between the body and insert, said pin being received within said grooves in both the body and insert at essentially the upper end of the insert and at essentially its lower end.

5. A well slip as recited in claim 4, in which said surface of one of said lips is inclined with respect to the horizontal and engages radially outwardly against a correspondingly inclined surface of the inert, and said surface of the other lip extends substantially directly vertically and faces radially outwardly and engages a correspondingly vertical surface on said insert.

6. A well slip structure including two gripping elements having irregularized gripping faces for contacting and gripping a well pipe at circularly offset locations, each of said faces curving essentially in correspondence with said pipe, each face having a series of teeth forming elongated gripping edges, the individual edges terminating at two opposite ends of the edges and advancing circularly about the axis of said pipe in extending between said ends, said edges being inclined to advance vertically as they advance circularly about the axis of the pipe, with the edges of both elements advancing in the same vertical direction as they advance in a predetermined circular direction, the gripping edges of one of said elements being offset vertically with respect to the gripping edges of the other element to locations vertically between positions of true longitudinal alignment with individual gripping edges of said other element.

7. A well slip structure as recited in claim 6, in which said edges of the two elements are inclined at essentially the same angle with respect to the horizontal.

8. A well slip as recited in claim 4, in which said pin is received within said grooves in both the body and insert along substantially the entire vertical extent of the insert.

References Cited

UNITED STATES PATENTS

| | | | |
|---|---|---|---|
| 1,562,469 | 11/1925 | Nixon | 24—249 |
| 1,758,108 | 5/1930 | Goeser | 24—263.5 |
| 2,048,209 | 7/1936 | Young et al. | 24—263.5 |
| 2,061,772 | 11/1936 | McLagan | 294—102 |
| 2,231,923 | 2/1941 | Koen | 24—263.5 |
| 2,290,799 | 7/1942 | Brauer | 24—263.5 |
| 2,589,159 | 3/1952 | Stone | 24—263.5 |
| 2,786,229 | 3/1957 | Carroll | 16—169 |
| 2,939,197 | 6/1960 | Leven | 24—263.5 |

FOREIGN PATENTS 243,625  12/1925  Great Britain.

DONALD A. GRIFFIN, *Primary Examiner.*